United States Patent [19]

Kuchar

[11] Patent Number: 5,098,341

[45] Date of Patent: Mar. 24, 1992

[54] AIR DIVERTER FOR CHAFF REMOVAL IN A COMBINE

[76] Inventor: George J. Kuchar, P.O. Box 595, Carlinville, Ill. 62626

[21] Appl. No.: 617,575

[22] Filed: Nov. 26, 1990

[51] Int. Cl.⁵ .............................................. A01F 12/00
[52] U.S. Cl. ...................................................... 460/99
[58] Field of Search ................... 460/71, 99, 101, 102, 460/107, 108, 902

[56] References Cited

U.S. PATENT DOCUMENTS

| | | | |
|---|---|---|---|
| 3,603,063 | 9/1971 | Stroburg | 460/99 X |
| 4,401,128 | 8/1983 | Fisher | 460/99 |

Primary Examiner—Thuy M. Bui
Attorney, Agent, or Firm—Emrich & Dithmar

[57] ABSTRACT

An air diverter positioned on an upper, forward portion of a sieve-like cleaning shoe in an agricultural combine directs a fan-generated air flow over the cleaning shoe to facilitate separation of chaff from grain which is directed onto and passes down through the cleaning shoe. A plurality of curved, spaced fins, or slats, receive the upward flow of air and deflect the air flow generally horizontally over the cleaning shoe for directing the chaff toward the rear of the combine where it is discharged. The inter-fin spacing decreases from bottom to top of the air diverter so as to increase air flow velocity for more efficient and higher capacity chaff removal.

14 Claims, 2 Drawing Sheets

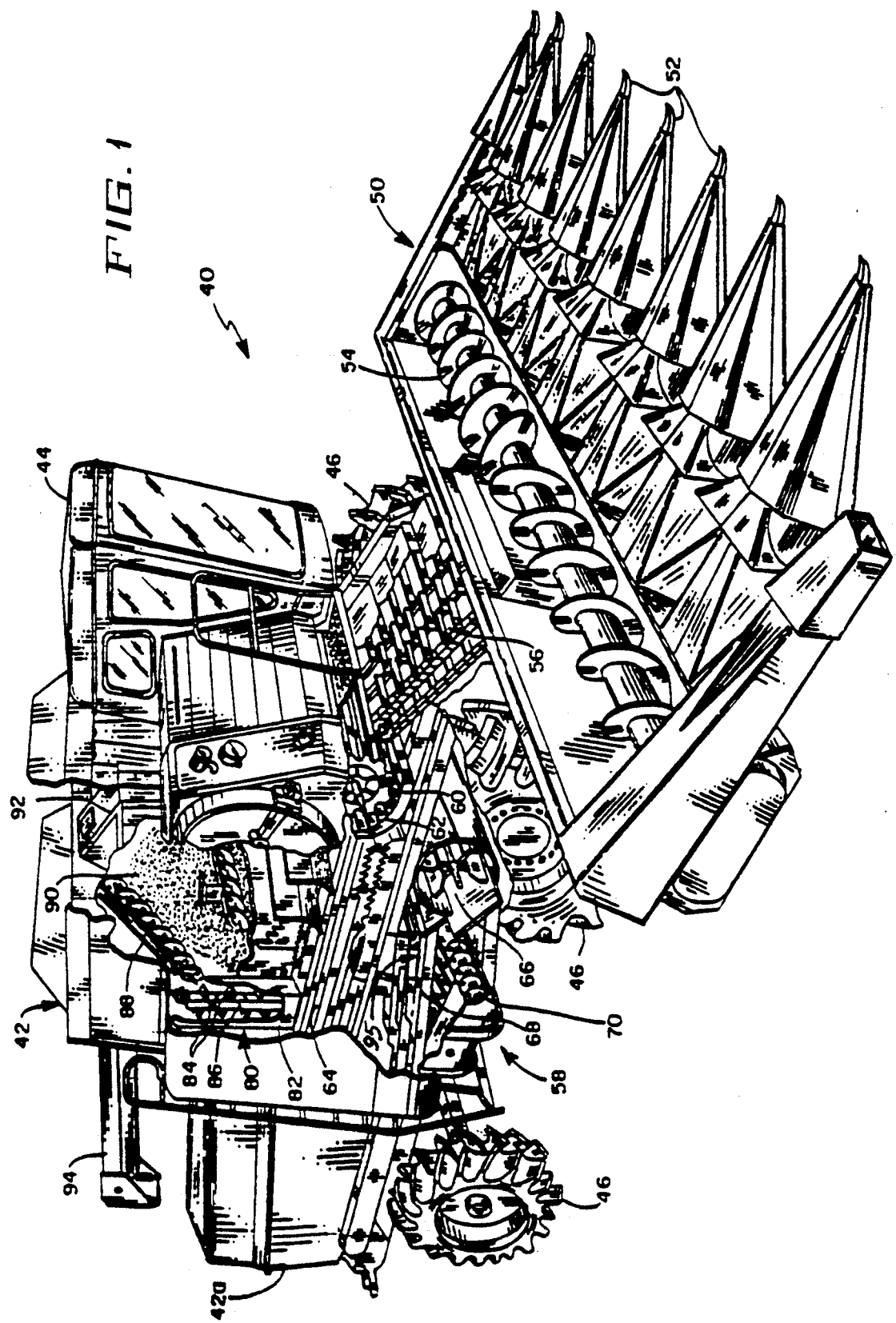

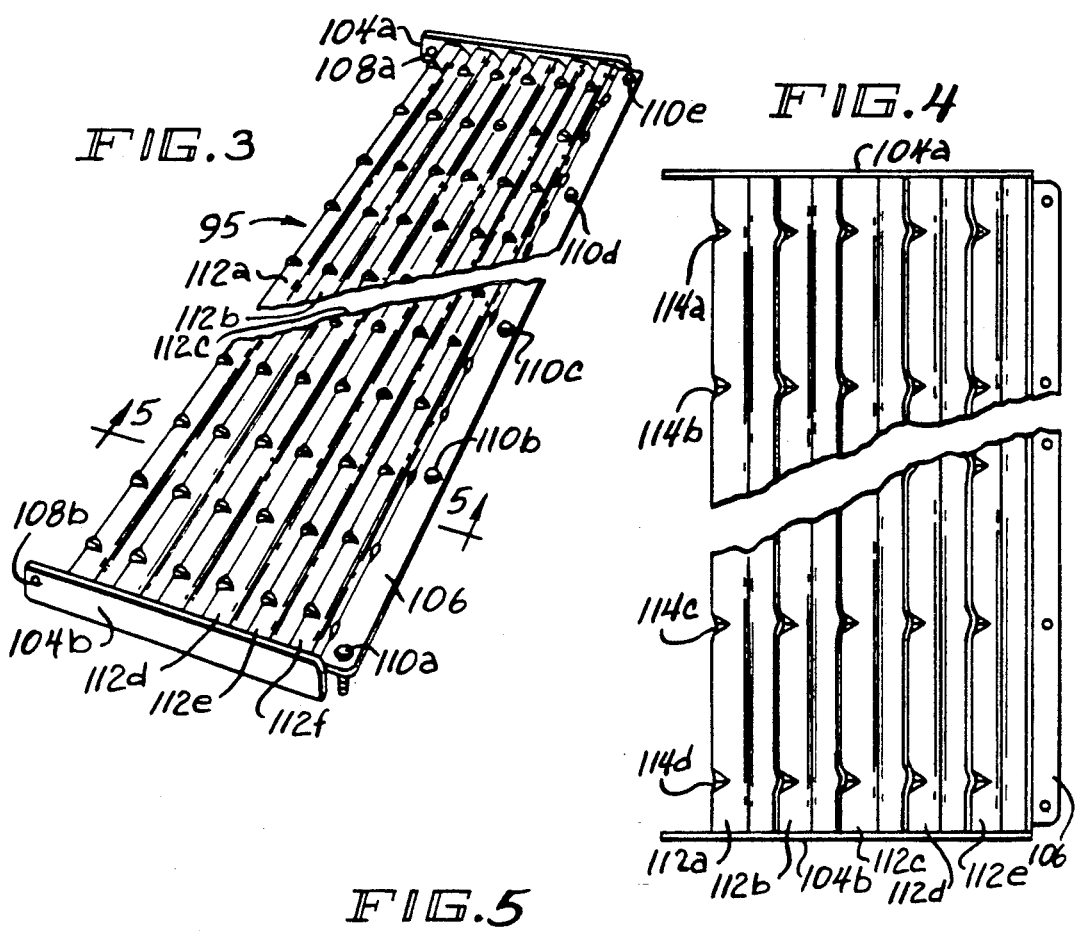

AIR DIVERTER FOR CHAFF REMOVAL IN A COMBINE

BACKGROUND OF THE INVENTION

This invention relates generally to the harvesting of grain and is particularly directed to the separation of chaff and grain in a combine.

A combine is an agricultural vehicle used in the harvesting of crops. The combine is typically self-propelled and is comprised of a forward header assembly and an aft drive and processing section. The header assembly typically is substantially wider than the aft portion of the combine and includes a plurality of spaced corn or row crop heads which are adapted for engaging the crops and removing the grain therefrom. The thus removed grain, in combination with crop residue such as husks in the case of corn harvesting, is then automatically delivered to the aft drive and processing section of the combine. In addition to housing the source of propulsion, such as a diesel engine and operator controls, the aft portion of the combine also includes a complicated threshing system for further separating the grain from the crop residue and for offloading the thus separated grain from the combine into a transport vehicle such as a truck. The crop residue is then exhausted from an aft portion of the combine and deposited in the field being harvested.

The threshing system includes many stages for separating the grain from the husk or leafy portion of the plant. An early stage of the threshing system typically includes a rotating cylinder operating in conjunction with a concave structure positioned adjacent to and below the cylinder to initiate grain-crop residue separation. The thus separated grain is then subjected to additional processing for further separation, while the crop residue, or chaff, is exhausted from the combine.

The additional processing to which the grain is subjected typically includes a vibrating sieve arrangement upon which the grain and chaff mixture is deposited. This sievelike structure, frequently referred to as a "chaffer", allows the grain to fall under the influence of gravity, while retaining chaff in separating the grain and chaff. Because the grain and chaff are frequently deposited upon the chaffer in a thick, mat-like mass, air is directed upward through the chaffer to break up this mat-like mass and blow the chaff upward for removal. While facilitating grain and chaff separation to some extent, this prior art approach has produced undesirable effects which actually retard the threshing operation. For example, the upward air blast through the sieve-like chaffer creates turbulence within the threshing stages which not only inhibits chaff removal from the combine, but also frequently recirculates the chaff from later to earlier threshing stages. This increases the time required for grain-chaff separation, slowing down the threshing operation, and necessitates additional work by the combine resulting in increased wear and tear on the combine as well as increased fuel consumption. Increased air turbulence within the combine also inhibits settling of the grain under the influence of gravity in a lower portion of the combine and tends to maintain the grain suspended, resulting in the discharge and loss of substantial quantities of grain from the aft of the combine.

OBJECTS AND SUMMARY OF THE INVENTION

This invention addresses the aforementioned limitations of the prior art by rendering the grain threshing operation faster, more efficient and cheaper. A baffle-like air diverter directs an air flow over the upper surface of a sieve-like chaff separation structure in a combine. The air flow directs the chaff toward the chaff discharge stages of the combine, while permitting the falling grain to pass through the separation structure. The inventive air diverter chaff separator is adapted for retrofitting in existing combine installations for increasing grain recovery, while more efficiently disposing of chaff and other debris ingested by the combine.

Accordingly, it is an object of the present invention to increase the efficiency of grain harvesting in a combine.

Another object of the present invention is to improve the separation of grain from chaff in a combine by directing a high velocity air flow through the grain-chaff mixture as it is deposited upon a sieve-like grain cleaning structure.

Still another object of the present invention is to direct a high velocity air flow across the upper surface of a chaff-grain separation sieve in a combine to break up the chaff-grain mat deposited on the sieve and separate the chaff from the grain.

A further object of the present invention is to increase grain recovery in a combine by reducing air turbulence within, and expediting chaff separation and discharge from, the combine.

A still further object of the present invention is to provide an air diverter for chaff removal which can easily be retrofitted in existing combine installations.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a partially cutaway perspective view of a combine illustrating the location of the air diverter for chaff removal of the present invention within the combine;

FIG. 2 is a simplified sectional view of an internal portion of the combine of FIG. 1 showing the position and operation of the inventive air diverter for separating grain and chaff within the combine;

FIG. 3 is an upper perspective view of the air diverter of the present invention for separating grain and chaff;

FIG. 4 is a bottom plan view of the air diverter of FIG. 3;

FIG. 5 is a sectional view of the air diverter shown in FIG. 3 taken along site line 3—3 therein; and FIG. 6 is an end-on view of one of the fins, or slats, used in the air diverter as shown in FIG. 5 taken along site-line 6—6 therein.

DETAILED DESCRIPTION OF THE PREFERRED EMBODIMENT

Referring to FIG. 1, there is shown a partially cutaway perspective view of a typical combine 40 in which the air diverter 95 of the present invention is intended for use. The combine 40 is comprised primarily of an aft separator/drive section 42 and a forward header assembly 50 attached to a forward portion of the separator/drive section. The separator/drive section 42 includes a cab 44 in which an operator sits and in which are positioned various operating controls for the combine. The separator/drive section 42 effects separation of the grain from the crop residue and includes a plurality of wheels 46 as well as a means for propulsion (typically a diesel engine which is not shown for simplicity) for moving the combine 40 through a field in harvesting the crops. The separator/drive section 42 includes an aft or exhaust end 42a from which the crop residue, after the grain is separated therefrom, is exhausted from the combine 40 and deposited in the field being harvested.

The header assembly 50 mounted to a forward portion of the separator/drive section 42 is wider than the separator/drive section and includes a plurality of head units extending along the length thereof, such as the corn heads 52 illustrated in FIG. 1. The header assembly 50 may also be provided with a plurality of spaced row crop heads along the length thereof for harvesting soybeans, wheat, milo or rice. The corn heads 52 are adapted to separate and remove the ears of corn from the plant stalk. The grain and the plant residue are then delivered to an aft portion of the header assembly 50 and are directed to the center thereof by means of a left- and right-hand spiraled auger 54. From the center, aft portion of the header assembly 50, the grain and residue mixture is delivered to a feeder house 56 which transports the mixture via a conveyor to the combination of a rotating cylinder drum 60 and a concave screen 62. The cylinder drum 60 includes a plurality of spaced raspbars extending along the length and spaced around the periphery thereof. Rotation of the cylinder drum 60 causes the raspbars to engage the corn husks and separate the cob from the leafy portion of the plant. A beater assembly, which is not shown in the figure for simplicity, is typically positioned immediately aft of the cylinder drum 60 and concave screen 62 combination for further carrying out the separation process. The beater assembly deposits the reduced mixture upon an elongated walker assembly 64 which is comprised of a plurality of vibrating sieves. The separated grain is allowed to fall through the vibrating sieves of the walker assembly 64, while the unwanted plant residue is retained on an upper portion of the walker assembly and displaced toward the rear of the combine. The thus separated grain which falls through the vibrating sieves of the walker assembly 64 is deposited upon a cleaning shoe 68, also known as a "chaffer," positioned below the walker assembly and comprised of a grate structure for further separating the grain from any crop residue remaining in the mixture. As the grain and residue mixture falls upon the cleaning shoe 68, a blower, or fan, 66 directs an air stream on the falling mixture to remove chaff therefrom. The chaff and other crop residue removed from the mixture in the earlier separation steps are discharged from the aft or exhaust end 42a of the combine 40. The thus cleaned grain collects in a lower portion of the separator section 58 of the combine and is laterally displaced by means of a rotating clean grain auger 70 to a center portion of the combine.

The clean grain auger 70 is coupled to and continuous with a generally vertically oriented grain elevator 80. The grain elevator 80 includes a housing 82 within which is positioned a plurality of paddles 84 attached to a moving endless chain 86. The grain elevator 80 lifts individual portions of grain upward where the grain 90 is then displaced by a loading auger 88 into a storage bin or tank 92. One end of an off-loading grain drill 94 may be positioned within the storage tank 92 for removing the grain positioned therein from the combine 40.

Referring to FIG. 2, there is shown a simplified sectional view of a portion of a combine illustrating the position of the air diverter 94 of the present invention. As previously described and as shown in FIG. 1, following separation of the corn cob from the leafy portion of the plant by the rotating cylinder and concave combination, the grain and chaff mixture is deposited upon either an elongated walker assembly 64 as shown in FIG. 1 or is displaced rearward by means of a rotating auger 102 as shown in FIG. 2. The walker assembly, or the auger 102 as shown in FIG. 2, deposits the grain and chaff mixture on the upper surface of a sieve-like cleaning shoe structure 68 having a large number of spaced apertures therein. The grain and chaff mixture is generally in the form of a thick mat making it difficult to separate the grain from the chaff. To effect this separation, the blower 66 directs a high velocity air flow upward through the apertures in the cleaning shoe 68 allowing the grain to fall through the apertures therein while deflecting the chaff upward and rearward. In the prior art, the upward deflection of the chaff resulted in its recirculation through the various threshing stages in the combine, increasing the load on the combine and prolonging the grain chaff separation process. In accordance with the present invention, the air diverter 95 is attached to a forward, upper portion of the cleaning shoe 68 for receiving the upward flow of air from the blower 66. The air diverter 95 deflects the air rearward across the upper surface of the cleaning shoe 68 to prevent the chaff from being blown back up into the walker assembly or earlier stages in the threshing process. The unique baffle arrangement of the air diverter 94 maintains air flow approximately 18 inches above the upper surface of the cleaning shoe 68 in a direction generally parallel to the upper surface and toward the rear of the combine to facilitate removal of chaff therefrom. After the grain is allowed to fall through the apertures in the cleaning shoe 68, it is further cleaned by an apertured sieve 100 which removes any remaining chaff and other unwanted debris. The grain then passes through the apertured sieve 100 for displacement to and storage in a bin or tank within the combine by means of an auger and elevator arrangement which includes a clean grain auger 70, as shown in FIG. 2.

Referring to FIG. 3, there is shown an upper perspective view of an air diverter 95 in accordance with the present invention. A bottom plan view of the air diverter 94 is shown in FIG. 4, while FIG. 5 is a sectional view of the air diverter shown in FIG. 3 taken along site line 5—5 therein. The air diverter 95 includes a pair of spaced side frame members 104a and 104b. Coupled to each of the side frame members 104a, 104b and extending therebetween are a plurality of spaced, curved fins, or slats, 112a-112f. Conventional means, such as weldments, may be used to securely attach each of the fins 112a-112f to each of the side frame members 104a, 104b. Disposed on a forward portion of the air diverter 95 and coupled to and extending between the side frame members 104a, 104b is a front frame member 106. The front frame member 106 is provided with a plurality of spaced apertures along the length thereof, with each aperture adapted to receive a respective mounting bolt 110a-110e for securely mounting the front frame member 106 to a forward, upper portion of the cleaning shoe 68. Each of the side frame members 104a, 104b is similarly provided with a respective aperture 108a, 108b for securely attaching the air diverter 95 to adjacent support structure (not shown) in the combine by conventional mounting pins (also not shown).

As shown in FIG. 5, each of the fins 112a-112f has a curved shape and includes an upward facing convex surface and a downward facing concave surface. While the inter-fin spacing is the same for all adjacent fins within the air diverter 95, it can be seen that the distance Y between the lower portions of adjacent fins is substantially greater than the distance X between upper portions of the same adjacent fins. This reduction in the inter-fin spacing along the direction of air flow through the air diverter 95 causes an increase in the velocity of the air flow as it passes through the air diverter and exits adjacent the upper surface of the cleaning shoe 68. The velocity of the air as it breaks up the grain and chaff mat above the cleaning shoe 68 and laterally displaces the chaff is substantially greater than the air flow as it exits and is directed upon the lower portion of the cleaning shoe 68 by the blower 66. The high velocity air flow more quickly and completely breaks up the grain-chaff mat to effect grain and chaff separation.

Disposed along the length of the upper edge of each of the fins in a spaced manner are a plurality of upward extending notches 114a-114d. The shape of these notches can most be seen in FIG. 6, which is a sectional view of a portion of the air diverter 95 shown in FIG. 5 taken along site line 6—6 therein. The spaced notches 114a-114d provide the upper portion of each of the fins 112a-112f with an irregular upper surface. This irregular upper surface on each of the fins 112a-112f makes it more difficult for grain to accumulate on the fins and facilitates downward flow of the grain through the inter-fin spaces. This reduces the likelihood of grain filling the inter-fin spaces and restricting air flow therethrough. Each of the notches 114a-114d is tapered as shown in the figures such that the notch is wider at the aft edge of the fin to ensure smooth air flow through the baffle arrangement. The taper of each of the notches also facilitates displacement of the grain over the upper surface of each of the fins.

There has thus been shown an improved arrangement for separating grain from chaff in a combine. The arrangement includes an air diverter for receiving and directing a high velocity air flow over the upper surface of a sieve-like cleaning shoe, or chaffer, where the air flow is generally parallel to the upper surface of the cleaning shoe. The grain is thus permitted to fall through apertures in the cleaning shoe after the chaff is blown away by the air flow for discharge from the combine. The air diverter not only reduces lost, or discharged, grain, but also prevents recirculation of the thus separated chaff within the combine, thus rendering the threshing operation more efficient.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a combine, an arrangement for separating chaff from grain comprising:
    a generally planar sieve-like structure having a plurality of apertures therein adapted for receiving a chaff and grain mixture directed thereon;
    fan means positioned below said sieve-like structure for directing an air flow upward through the apertures in said sieve-like structure; and
    air diverter means disposed above said sieve-like structure for receiving and deflecting the air flow over and generally parallel to an upper surface of said sieve-like structure for displacing chaff across and over said sieve-like structure while allowing the grain to fall through the apertures in said sieve-like structure.

2. The arrangement of claim 1, wherein said air diverter means is positioned on an upper surface of said sieve-like structure.

3. The arrangement of claim 1, wherein said air diverter means is positioned on a forward, upper portion of said sieve-like structure and said fan means is disposed forward of and below said sieve-like structure, and wherein said air diverter means directs the air flow from a forward portion over an upper, aft portion of said sieve-like structure.

4. The arrangement of claim 1, wherein said air diverter means includes a plurality of spaced, curved fins disposed immediately above said sieve-like structure for redirecting the air flow in a direction generally parallel to an upper surface of the sieve-like structure.

5. The arrangement of claim 1, wherein said air diverter means is disposed adjacent to a forward portion of said sieve-like structure for deflecting the air flow from front to rear of and across said sieve-like structure.

6. The arrangement of claim 5, wherein said fan means is disposed below and forward of said sieve-like structure for directing the air flow up through, as well as from front to rear of, said sieve-like structure.

7. The arrangement of claim 6, wherein said air diverter means includes a plurality of spaced, curved fins for deflecting the upward directed air flow rearward and generally parallel to an upper surface of said sieve-like structure.

8. The arrangement of claim 7, wherein said air diverter means further includes at least one mounting plate for securely attaching said air diverter means to said sieve-like structure.

9. The arrangement of claim 8 further comprising coupling pins for attaching said at least one mounting plate to said sieve-like structure.

10. The arrangement of claim 7, wherein each curved fin includes an upward facing convex surface and a downward facing concave surface.

11. The arrangement of claim 10, wherein adjacent fins are arranged in an overlapping manner, with an upper end of a first fin disposed above a lower end of an adjacent second fin.

12. The arrangement of claim 11, wherein the upper end of each fin includes a plurality of spaced, upward extending notches so as to form an irregular, non-flat surface to prevent accumulation of grain thereon.

13. The arrangement of claim 7, wherein each fin includes a lower edge and an upper edge, and wherein the upper edges of adjacent fins are positioned closer together than the lower edges thereof for increasing the velocity of the air flow through said air diverter means and over the upper surface of said sieve-like structure.

14. In a combine, wherein a mixture of chaff and grain is received at a forward portion of the combine and chaff is discharged from an aft portion of the combine, an arrangement for separating the grain from the chaff comprising:

a generally flat, sieve-like structure having a plurality of spaced apertures therein and adapted to receive the chaff and grain mixture on an upper portion thereof;

blower means disposed forward of and below said sieve-like structure for directing an air flow up through the apertures in said sieve-like structure; and air diverter means disposed on an upper, forward portion of said sieve-like structure for receiving and deflecting the air flow through said sieve-like structure rearward and generally parallel to an upper surface thereof for moving the chaff rearward over the sieve-like structure while allowing the grain to fall through the apertures in said sieve-like structure, wherein said air diverter means restricts air flow to increase the velocity of the air over the upper surface of the sieve-like structure.

* * * * *